United States Patent [19]

Fasnacht

[11] Patent Number: 4,736,888
[45] Date of Patent: Apr. 12, 1988

[54] ROW CROP BAND SPRAYER

[76] Inventor: Kenneth P. Fasnacht, Rte. 3, Box 83, Janesville, Minn. 56048

[21] Appl. No.: 16,448

[22] Filed: Feb. 17, 1987

Related U.S. Application Data

[63] Continuation of Ser. No. 748,911, Jun. 26, 1985, abandoned.

[51] Int. Cl.⁴ .............................................. B05B 1/20
[52] U.S. Cl. .................................. 239/161; 239/162; 239/169; 239/175
[58] Field of Search ............... 239/162, 164, 161, 165, 239/166, 175, 176, 169, 653, 661, 588; 47/1.5, DIG. 4, 1.7; 248/75, 80

[56] References Cited

U.S. PATENT DOCUMENTS

| Re. 26,166 | 3/1967 | Inhofer | 47/1.7 |
| 668,950 | 2/1901 | Brakeley . | |
| 1,348,038 | 7/1920 | Neumeyer . | |
| 1,526,642 | 2/1925 | Nissley | 239/164 |
| 2,501,555 | 3/1950 | White . | |
| 2,554,432 | 5/1951 | Walters | 239/661 X |
| 2,575,521 | 11/1951 | Ireland | 239/169 X |
| 2,754,622 | 7/1956 | Rohnert | 239/176 X |
| 3,504,857 | 4/1970 | Ballu | 239/168 |
| 3,515,349 | 6/1970 | Mecklin et al. | 239/169 |
| 3,584,787 | 6/1971 | Thomason | 239/121 |
| 3,866,834 | 2/1975 | Shannon | 239/167 |
| 3,874,593 | 4/1975 | Wilt | 239/588 X |
| 4,257,190 | 3/1981 | Dykes | 47/1.7 X |
| 4,350,294 | 9/1982 | Gaspard | 239/169 |
| 4,439,998 | 9/1984 | Brown et al. | 47/1.7 |
| 4,521,988 | 6/1985 | Thacker | 47/1.7 |

FOREIGN PATENT DOCUMENTS

| 426698 | 5/1911 | France | 239/164 |
| 745836 | 5/1933 | France . | |
| 1574308 | 9/1980 | United Kingdom | 239/172 |

*Primary Examiner*—Andres Kashnikow
*Assistant Examiner*—Kevin P. Weldon
*Attorney, Agent, or Firm*—Burd, Bartz & Gutenkauf

[57] ABSTRACT

A liquid dispensing implement having a tool bar and a plurality of liquid dispensing assemblies pivotally connected to the tool bar. Each fluid dispensing assembly has a body having an upright member in the rear portion thereof. A ground engaging wheel moves the body along the contour of the ground. A pair of liquid dispensers are mounted on a cross beam connected to the upright member. Each liquid dispenser has a pair of side nozzles and a top nozzle for directing fluid in band along opposite sides of the row of crops and onto the top of the crops.

14 Claims, 3 Drawing Sheets

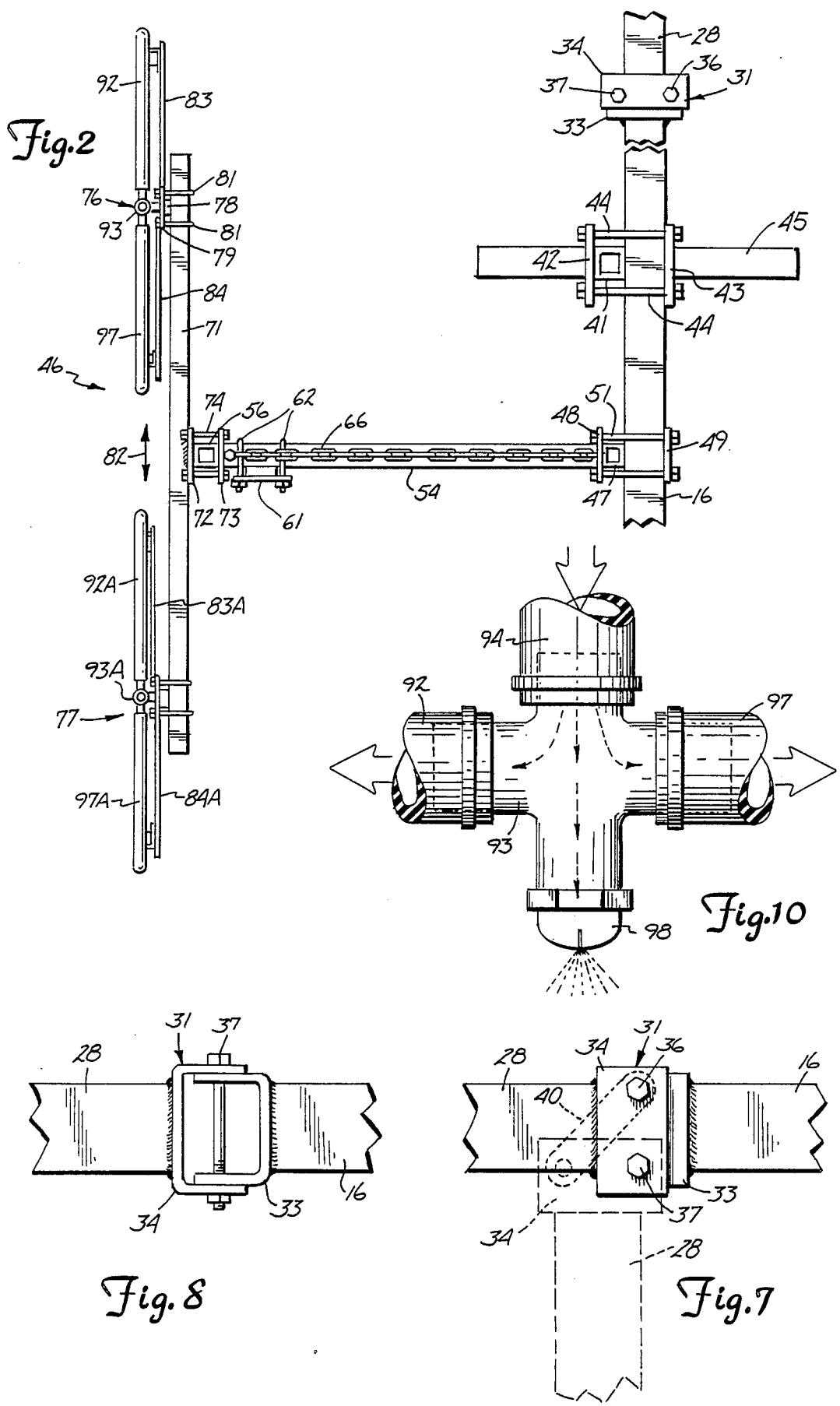

ROW CROP BAND SPRAYER

This application is a continuation of application Ser. No. 748,911 filed June 26, 1985, now abandoned.

FIELD OF INVENTION

The invention is in the field of agricultural spraying implements used to apply liquid chemicals on soil to control weeds and insects. The class of spraying implements of the invention is band sprayers operable to apply a band of liquid chemical, such as a herbicide only, along a row of crops and onto the crops.

BACKGROUND OF ThE INVENTION

Agricultural chemicals, such as herbicides, must be properly applied to the ground and the crops to insure the desired weed control and minimize carryover problems. Improper herbicide applications can reduce crop yields in the year after the herbicide has been applied. Improper application due to implement set up and use is a major cause of poor spray patterns and uneven coverage of the herbicides. Weed growth is not controlled because sections of the field receive inadequate herbicide coverage. It is common practice to broadcast the herbicide onto the ground and crops. This places substantial amounts of herbicide in between the rows of crops where it is not needed for weed control. The increased amounts of herbicide increase the costs and can lead to environmental problems. Spraying implements that restrict the dispensing of the herbicide into areas or bands adjacent the plants have been proposed. Inhofer in U.S. Pat. No. Re. 26,166 discloses a weed spraying device having spraying nozzles that direct the liquid chemicals along the ground adjacent the base of a row of crops.

SUMMARY OF THE INVENTION

The invention is directed to an agricultural chemical dispense implement operable to apply a fluid agricultural chemicals in bands to plants or introduce the chemical to the ground adjacent the plants. The dispenser implement has a transverse tool bar accommodating a three point hitch adapted to be mounted on an agricultural tractor. The tool bar has outer sections that are hinged to a central section to allow the implement to be folded to a transport position. A plurality of separate fluid material dispenser assemblies are mounted on the tool bar. Each dispenser assembly has an upright standard mounted with a clamp to the tool bar. The clamp allows vertical adjustment of the standard. A rearwardly directed body is pivotally connected to the bottom of the standard. An upright support is attached to the rear end of the body. A cross bar is connected with a clamp to the upright member. A gauge wheel, having an upright member, is adjustably mounted on the rear portion of the body to support the rear end of the body on the ground. Downward movement of the body and the gauge wheel is controlled with an elongated flexible member, such as a chain. One end of the chain is connected to the rear end of the body. The opposite end is releasably connected to the upper end of the standard.

Fluid material dispensers are mounted on opposite ends of the cross arms. Hoses connect the dispensers to a pump operable to move fluid material from a storage tank and deliver the fluid material under pressure to the dispensers. Each dispensers has an upright member adjustably mounted on the cross member. A pair of outwardly diverging arms are connected to the lower end of the upright member with a bolt. Each arm has a plurality of holes to accommodate the bolt to allow for the lateral adjustment of the arms and width of the band of fluid material discharged on the row of crops. A top nozzle is connected to the lower end of the coupling to discharge chemical in a downward direction. Second and third side nozzles are mounted on the lower ends of the diverging arms. Flexible hoses connect the second and third side nozzles to the coupling. The flexible hoses function as yieldable supports to hold the side nozzles in selected adjusted positions adjacent opposite sides of the row of crops. The side nozzles have a fan spray pattern that is extended in a vertical plane. This spray pattern dispenses the fluid material, such as a herbicide, insecticide or the like onto the sides of the crops and under the leaves of the crops. This results in an effective distribution of the fluid material to kill the weeds or insects. A minimum amount of fluid material can be used and thereby lowering the cost of the fluid material per acre and minimize the contamination of the environment.

DESCRIPTION OF DRAWING

FIG. 2 is a fragmentary and enlarged top view of one fluid dispensing assembly of the implement of FIG. 1;

FIG. 8 is a rear elevational view of the tool bar hinge assembly shown in FIG. 2;

FIG. 9 is a top view of FIG. 8;

FIG. 10 is an enlarged elevational view of the fluid coupling and top nozzle of the dispenser.

DESCRIPTION OF PREFERRED EMBODIMENT

Figure 1:
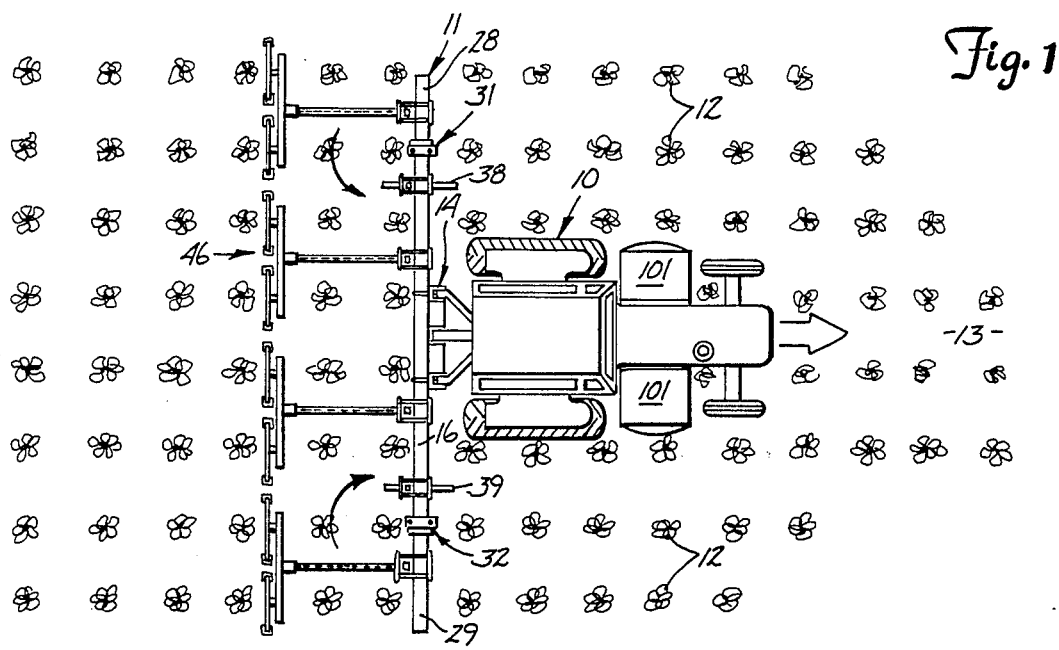
FIG. 1 is a diagrammatic view of a row crop spraying implement of the invention mounted on a tractor.
Figure 6:
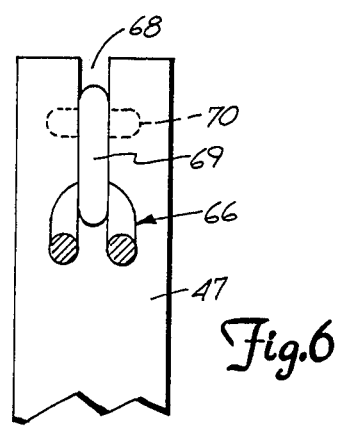
FIG. 6 is an enlarged sectional view taken along the line 6—6 of FIG. 4.

Referring to FIG. 1, there is shown an agricultural tractor indicated generally at 10 located in a field having growing row crops 12, such as corn, soybeans, sunflowers, and the like. An agricultural chemical dispenser or spraying implement indicated generally at 11 mounted on the three point hitch 14 of tractor 10 operates to discharge fluid material in bands adjacent the rows of crops 12. The fluid material is a liquid agricultural chemical, as a herbicide, fertilizer, insecticide and the like. Hitch 14 is releasably connected to a transverse tool bar 16. Hitch 14 has draft links 17 and 18 and a control link 19 as shown in FIG. 6. Draft links 17 and 18 are connected to a pair of channel members 21 and 22 secured to tool bar 16 with U-bolts 30A and 30B. Pins 24 and 26 releasably connect draft links 17 and 18 to channel members 21 and 22. Control link 19 is connected to a third channel member 23 with a pin 27. Upwardly converging frame members 25 connect channel member 23 to channel members 21 and 22.

Returning to FIG. 1, tool bar 16 has end sections 28 and 29 that are pivotally connected to a mid-section 30 with hinge assemblies 31 and 32. The details of hinge assembly 31 are shown in FIGS. 8 and 9. Hinge assembly 32 is identical to hinge assembly 31. The hinge assemblies 131 and 132 allow the end sections 28 and 29 of the tool bar to swing in a rearward direction to longitudinally locate the end sections 28 and 29. The tool bar 16 can be quickly folded to a transport position behind tractor 10. Hinge assembly 31 has a first U-shaped member 33 secured to the outer end of the mid-section 30 of tool bar 16. A second U-shaped member 34 extends over the ends of the first U-shaped member 33 and is secured to the inner end of the tool bar section 28. A pair of upright pins 36 and 37 extend through aligned holes in U-shaped members 33 and 34 to prevent the pivoting of the hinge assembly 31. When pin 36 is removed, end section 28 can be pivoted to a rearward longitudinal position as shown in broken lines in FIG. 9 thereby locating tool bar in the folded transport position. A transport lock bar 40, shown in FIG. 9, holds tool bar section 28 in folded position. Pin 36 secures bar 40 to member 33. Bar 40 has a short peg (not shown) extended into the hole in member 34. Tool bar 16 can be a one-piece bar without hinged outer sections for spraying implements used with 4 and 6 row applications.

The pair of upright stands 38 and 39 are secured to opposite ends of the mid-section of tool bar 16. The stands 38 and 39 are used to hold the tool bar 16 in a generally horizontal position during the storage of the implement. Stands 38 and 39 are identical in structure. The following description is directed to stand 38. As shown in FIG. 2, stand 38 has an upright post 41 secured to tool bar 16 with a pair of plates 42 and 43 and nut and bolt assemblies 44. An elongated longitudinal foot 45 is secured to the lower end of post 41. Foot 45 is adapted to engage the ground to support the tool bar 16 in an elevated position. When the implement is used to spray liquid material onto the row crops or ground, the stands are moved to an elevated position. This is achieved by loosening the nut and bolt assemblies 44 and raising post 41.

Figure 4:
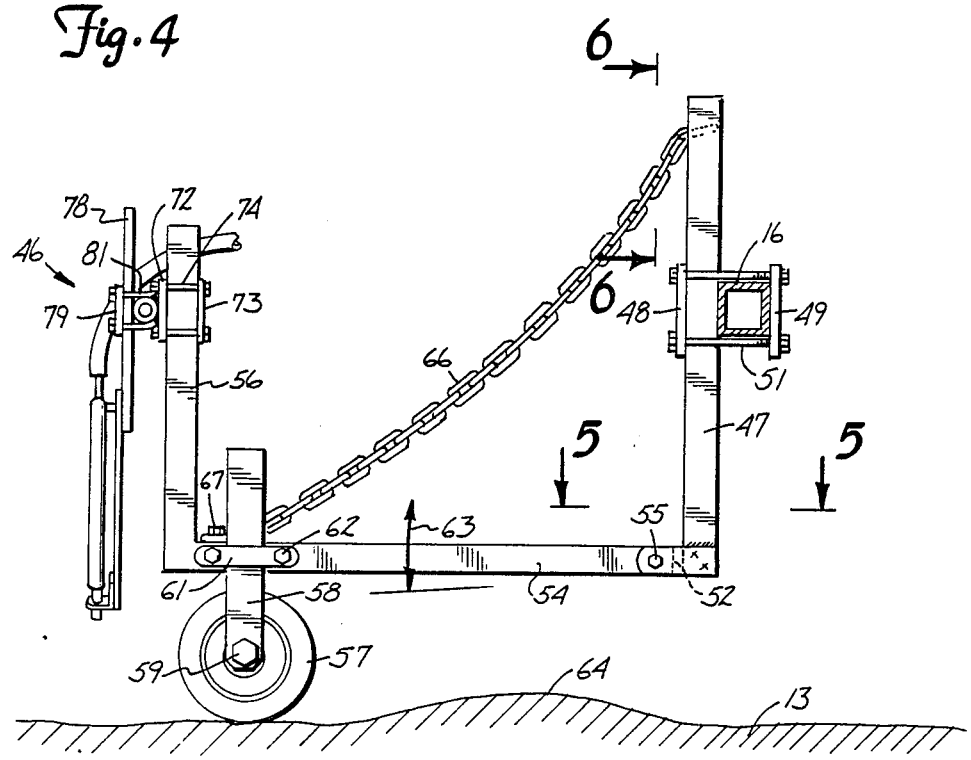
FIG. 4 is a side elevational view of the fluid dispensing assembly of FIG. 2.
Figure 5:
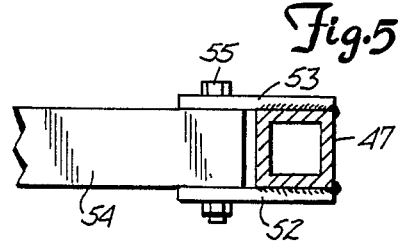
FIG. 5 is a enlarged sectional view taken along the line 5—5 of FIG. 4.
Figure 7:
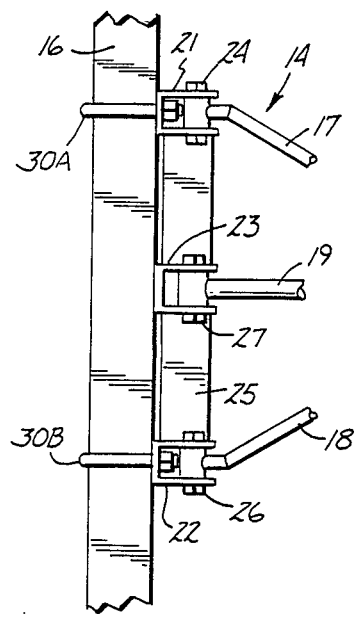
FIG. 7 is a top view of the three point hitch connecting the implement to the tractor.

Returning to FIG. 1, a plurality of fluid material dispensing assemblies are connected to tool bar 16. Each dispensing assembly is associated with a pair of rows of crops 12 to discharge the fluid material, such as a herbicide, onto the crops 12 and the ground adjacent the crops. The dispensing assemblies 46 independently follows the contour of the ground to automatically adjust to variations in terrain. A band of fluid material is sprayed onto each row of crops in a uniform and economical manner. The dispensing assemblies 46 are identical in structure and operation. The following description is limited to a single dispensing assembly. Dispensing assembly 46 has an upright standard 47. As shown in FIGS. 2 and 4, standard 47 is clamped to tool bar 16 with a pair of plates 48 and 49 and nut and bolt assemblies 51. The vertical position or elevation of standard 47 can be adjusted by loosening the nut and bolt assemblies 51 and repositioning standard 47 relative to tool bar 16. As shown in FIG. 5, a pair of rearwardly directed short plates or ears 52 and 53 secured by welds or the like to the lower end of standard 47. An elongated body 54 has a forward end located between ears 52 and 53. A transverse pivot pin 55, such as a nut and bolt assembly, pivotally connects arm 54 to ears 52 and 53 to permit the arm to swing up and down as indicated by the arrow 63 in FIG. 4. An upright post or member 56 is attached to the rear end of body 54. A ground engaging wheel 57 located below the rear end of body 54 raises and lowers body 54 in accordance with the contour 64 or irregularities of the surface of ground 13. Wheel 57 is rotatably mounted on an axle 59 attached to the lower end or upright member of a bar 58. A clamp plate 61 extended over member 58 is attached to body 54 with a pair of bolts 62. Bolts 62 can be released to allow member 58 to be vertically adjusted relative to body 54 and thereby adjust the vertical position of the fluid dispensing nozzles of dispensing assembly 46. As shown in FIG. 4, when wheel 57 moves over hump or ridge 64 in the surface of ground, body 54 will swing in an upward direction whereby the fluid material being dispensed by dispensing assembly 46 follows the contour of the ground and the row crops growing therein. This maintains the selected placement of fluid material on the ground and/or row of crops.

The downward pivotal movement of body 54 is limited by an elongated flexible member 66, shown as a link chain. A bolt 67 secures the rear end of flexible member 66 to the rear of body 54. The forward and upper end of flexible member 66 is releasably mounted on the upper end of standard 47. As shown in FIG. 6, the upper end of standard 47 has a vertical slot 68 accommodating a vertical link 69 of flexible member 66. A cross link 70 connected to link 69 prevents the member 66 from being pulled out of standard 47. The maximum downward movement of body 54 can be adjusted by changing the position of the links 69 and 70 relative to the upper end of standard 47. Link 69 can be vertically removed from the slot 68 and replaced with another vertical link to selectively elongated or shorten flexible member 66. A bolt can be attached to the end of the flexible member 66 to prevent separation of the flexible member from the top of standard 47.

Figure 3:
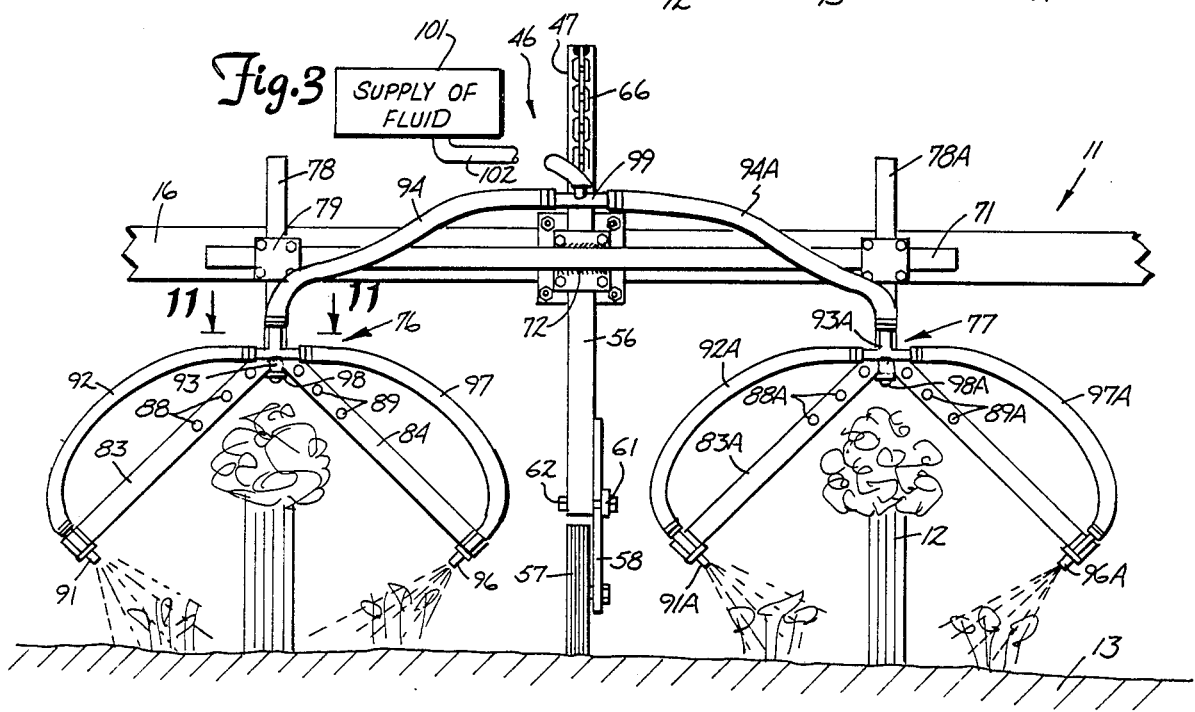
FIG. 3 is a rear elevational view of the fluid dispensing assembly of FIG. 2.

As shown in FIGS. 2 and 3, and cross bar 71 is mounted on upright end 56. The mid-section of cross bar 71 is secured to a plate 72 by welds or the like. A second plate 73 cooperating with nut and bolt assembly 74 secures plate 72 in a selected adjusted position along the vertical extent of upright member 56. Nut and bolt assembly 74 can be released to permit selected vertical adjustment of cross bar 71. Fluid material dispenser units or dispenser indicated generally at 76 and 77 mounted on opposite ends of cross bar 71 are operable to discharge fluid material, such as liquid herbicide, in band adjacent opposite sides of a pair of rows of crops and onto the top of the crops. Dispensers 76 and 77 are identical in structure. The parts of dispenser 77 that correspond to the part of dispenser 76 have the same reference numerals with the suffix A.

Figure 11:
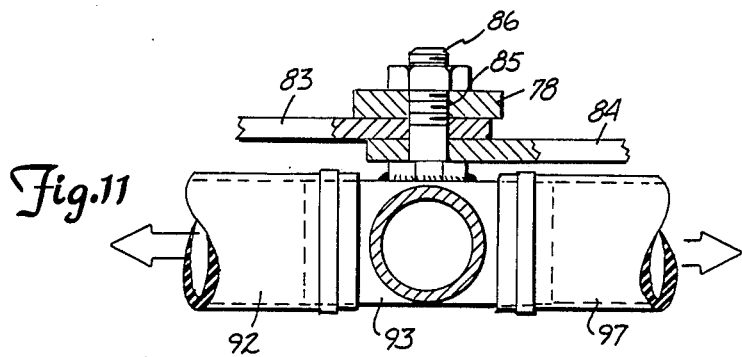
FIG. 11 is an enlarged sectional view taken along line 11 of FIG. 3.

Returning to FIGS. 3 and 4, dispenser 76 has an upright bar 78 attached to cross beam 71 with a plate 79 and a pair of U-bolts 81. U-bolts 81 permit the entire dispenser 76 to be laterally adjustable so that fluid dispensing assembly 46 can accomodate row crops having different widths between adjacent rows of crops. The lateral adjustment of dispenser 76 is shown by arrow 82 in FIG. 2. A pair of downwardly and outwardly diverging arms 83 and 84 are connected to the lower end of bar 78. As shown in FIG. 9, a pin 86 in the form of a bolt extends through aligned holes in arms 83 and 84 and hole 85 in bar 78. A nut 87 holds bolt 86 in the assembled relation with arms 83 and 84 and bar 78. Other types of connecting structures can be used to attach arms 83 and 84 to bar 78. As shown in FIG. 3, arms 83 and 84 have a plurality of holes 88 and 89 respectively extended along the length thereof. The holes 88 and 89 are adapted to accommodate bolt 86 to adjust the length of the arms that extends downwardly from the lower end of bar 78. A first nozzle 91 is mounted on the lower end of arm 83. A hose 92 connected to nozzle 91 leads upwardly and inwardly to a coupling 93. As shown in FIG. 11, coupling 93 is secured to the bolt 86. Fluid material under pressure is supplied to coupling with a flexible hose 94.

A second nozzle 96 is mounted on the outer or lower end of arm 84. Nozzle 96 is laterally spaced from nozzle 91. A hose 97 connected to nozzle 96 extends to the coupling 93. Hoses 92 and 97 are flexible rubber or plastic hoses that carry fluid material under pressure to nozzles 91 and 96 attached to the outwardly and downwardly diverging arms 83 and 84 as shown in FIG. 3. The arms 83 and 84 hold nozzles 91 and 92 in positions such that the fluid material discharged from nozzles is directed downwardly onto the ground adjacent the base of crops 12. The flexible hoses 92 and 97 also allow the arms 92 and 97 to be repositioned on bolt 86 without disconnecting the hoses from the nozzles 91 and 96. An additional nozzle 98 is secured to the fourth downwardly directed branch of coupling 93. Nozzle 98 directs a spray of fluid downwardly onto the top of the crops 12. Hoses 94 and 94A lead to a T-connector 99. The T-connector 99 is fed with a fluid under pressure from a supply 101 through a elongated hose 102 as diagrammatically shown in FIG. 3. Supply 101 may be chemical carrying tanks mounted on the opposite sides of tractor 10. A pump, not shown, is used to move the fluid material from the tanks to the hose 102 to feed fluid under pressure to the dispensers 76 and 77. Other types of dispensers, such as a three drop nozzle, can be used to direct the fluid material toward the row of crops. Each drop nozzle has a downwardly or rearwardly directed tubular body attached to a long cross beam 71. Nozzle units or fluid dispensers are attached to the outer ends of each tubular body to direct a spray toward the ground toward the lower parts of the plants. The nozzle units can have selected spray patterns, such as, fan, cone, hollow cone, 150° fan and the like.

In use, implement 11 is mounted on three point hitch 14 of tractor 10. Tool bar 16 extends transversely of the tractor and the rows of crops 12. As shown in FIG. 1, eight rows of plants are simultaneously treated with bands of fluid material, such as a liquid herbicide, along each of the rows of plants. The implement can have a different number of fluid material dispensing assemblies to accommodate six, eight, or twelve rows of crops. The fluid material is not broadcast on the ground and crops. The fluid material under pressure is supplied to each of dispensers 76 and 77 of all of dispensing assemblies 46. The fluid material is discharged through nozzles 91 and 96 and 98 in bands adjacent the base of the crops and onto the top of the crops. The fluid covers both the top and the bottom surfaces of the crops. The dispensers 76 and 77 follow the contour or irregularities in the ground so that the locations of nozzles 91, 96 and 98 relative to the crops remains substantially constant thereby insuring uniform application of the bands of fluid material adjacent opposite sides of the base of the crops. This conserves fluid material because the recommended application rate of fluid material can be followed without skipping parts of the crops. The width of the bands of the fluid material adjacent opposite sides of crops 12 can be changed by alternating the length of arms 83 and 84. When the arms 83 and 84 are shortened, nozzles 91 and 92 are moved closed to each other thereby making the width of the bands smaller and more confined to the base of crops 12. The elevation of nozzles 91, 96, and 98 can be adjusted by adjusting the height of bar 78 on cross beam 71. Further vertical adjustment can be made by changing the vertical position of the cross beam 71 relative to upright member 56.

While there has been shown and described a preferred embodiment of the fluid dispensing implement, it is understood that changes in the parts, arrangement of parts and materials may be made by those skilled in the art without departing from the invention. The invention is defined in the following claims.

The embodiments of the invention in which an exclusive privelege or property is claimed are defined as follows:

1. An implement for dispensing fluid material in bands along rows of crops located in a field comprising: a tool bar adapted to extend transversely of the rows of crops, a plurality of fluid dispensing assemblies connected to the tool bar operable to direct fluid material in bands along the rows of crops, each of said fluid dispensing assemblies being connected to the tool bar and operable to direct fluid material in bands along the rows of crops when the implement is moved along said rows of crops, each of said fluid dispensing assemblies having an upright standard, said standard having an upper end and a lower end, clamp means mounting the standard on the tool bar, said clamp means having releasable means allowing vertical adjustment of the standard relative to the tool bar, an elongated body extended rearwardly from the lower end of the standard, said body having a forward end and a rear end, means pivotally connecting the forward end of the body to the lower end of the standard for movement about a generally horizontal axis extended generally parallel to the tool bar to allow the rear end of the body to move up and down, ground engaging wheel means, a member having an axle rotatably supporting the wheel means, means mounting the member on the rear end of the body whereby the wheel means support the rear end of the body above the ground and cause the body to swing up and down whereby the rear end of the body follows the contour of the ground, said means mounting the member including releasable means allowing vertical adjustment of the wheel means relative to the rear end of the body, an upright support secured to the rear end of the body extended upwardly therefrom, a generally horizontal cross beam located adjacent said support, said cross beam having a first end section and a second end section located on opposite sides of the support, said connecting means being adjustable along the length of the support to adjust the vertical position of the cross beam on the support, first fluid dispensing means mounted on the first end section of the cross beam for directing fluid material in a band along a first row of crops, second fluid dispensing means mounted on the second end section of the support for directing fluid material in a band along a second row of crops, and means for supplying fluid material under pressure to said first and second dispensing means, each of said first and second dispensing means having an upright bar having a lower end, means mounting the bar on said cross beam and holding the bar in a selected vertical location relative to the cross beam, said vertical adjustment of the wheel means, cross beam, and upright bar concurrently adjusting the height of the first and second fluid dispensing means above the ground, a pair of arms diverging outwardly and downwardly from the lower end of the bar, pin means securing the arms to the lower end of the bar, nozzle means mounted on the outer ends of the arms for directing fluid material downwardly and inwardly toward the adjacent row of crops, said means for supplying fluid material under pressure including hose means connected to said nozzle means, a hose coupling for carrying fluid material, said coupling including a first tubular portion and a second tubular portion, means connecting the coupling to the bar, said hose means comprising a first flexible hose connected to one nozzle means and the first tubular portion to carry fluid material to said one nozzle means, and a second flexible hose connected to the other nozzle means and the second tubular portion to carry fluid material to said other nozzle means.

2. The implement of claim 1 including: flexible link means connected to the rear end of the body and the upper end of the standard to limit downward movement of the body.

3. The implement of claim 1 wherein: said tool bar has a middle section and end sections at opposite ends of the middle section, and hinge means connecting the end sections to the middle sections, said hinge means having releasable holding means to maintain the end section in alignment with the middle section.

4. The implement of claim 1 wherein: each of said arms has a plurality of holes spaced from each other along the length of the arm, said pin means securing the arms to the lower end of the bar extended through selected aligned holes in said arms.

5. The implement of claim 1 including: second nozzle means connected to said coupling to direct fluid downwardly onto said row of plants.

6. An implement for dispensing fluid material in bands along parallel rows of crops located in a field comprising: a tool bar, at least one fluid dispensing assembly connected to the tool bar operable to direct fluid material in bands along a pair of parallel rows of crops, when the implement is moved along said rows of crops, said fluid dispensing assembly having a body with a rear end and a forward end, an upright standard having a lower end, first means adjustably mounting the standard on the tool bar whereby the standard is vertically and laterally adjustable on the tool bar, means pivotally connecting the forward end of the body to the lower end of the standard for movement about a generally horizontal axis to allow the rear end of the body to swing up and down and the forward end of the body to be vertically adjustable with the vertical adjustment of the standard, an upright member connected to the rear end of the body, ground engaging wheel means for supporting the rear end of the body above the ground and causing the rear end of the body to swing up and down to follow the contour of the ground, bar means mounting the wheel means on the body, releasable second means attaching the bar means to the body operable to allow vertical adjustment of the wheel means relative to the body, a generally horizontal cross beam mounted on the upright member in a selected vertical position and allowing the position of the cross beam to be vertically adjusted on the upright member, first fluid material dispensing means mounted on one end section of the cross beam for directing fluid material toward a first row of crops, fourth means mounting the first fluid matrial dispensing means on said one end section of the cross beam and allowing lateral and vertical adjustment of the first fluid material dispensing means on the cross beam, a second material dispensing means mounted on the other end section of the cross beam for directing fluid material toward a second row of crops, fifth means mounting the second fluid material dispensing means on said other end section of the cross beam in a selected lateral position on the cross beam and allowing lateral and vertical adjustment of the second fluid material dispensing means on the cross beam, each of said fluid material dispensing means each having nozzle means for directing fluid material toward said rows of crops and sixth means for adjusting the vertical position of the nozzle means, said vertical adjustment of the wheel means, cross beam, first and second fluid material dispensing means, and nozzle means cooperating to adjust the height of the first and second fluid dispensing means above the ground so that the fluid material is directed by the nozzle means toward a selected area of the rows of crops, and means for carrying fluid material under pressure to said first and second dispensing means.

7. The implement of claim 6 including: flexible link means connecting the body to the standard to limit downward movement of the body.

8. The implement of claim 6 wherein: each of said fluid dispensing means includes a bar having an end, said fourth means mounting the bar on the cross beam and holding the bar in a selected position relative to the cross beam, a pair of arms diverging outwardly and downwardly from the bar, said arms having laterally spaced outer end portions, said sixth means including means securing the arms to the bar, said nozzle means mounted on the outer end portions of the arms for directing fluid downwardly and inwardly toward the adjacent two of crops, said means for supplying fluid under pressure being connected to said nozzle means.

9. The implement of claim 8 wherein: each of said arms have a plurality of holes spaced from each other along the length of the arm, said means for securing the arms to the bar includes pin means extended through selected aligned holes in said arms and connected to said bar.

10. The implement of claim 9 including: hose means connected to each nozzle means for carrying fluid material to said nozzle means.

11. The implement of claim 8 including: a fluid material carrying coupling mounted on the bar receiving fluid material under pressure, a first hose connecting the coupling to one nozzle means, and a second hose connecting the coupling to the other nozzle means whereby fluid material under pressure is concurrently supplied to both of said nozzle means 12. The implement of claim 11 including: second nozzle means connected to said coupling to direct fluid material downwardly onto said row of crops.

13. The implement of claim 11 wherein: said sixth means including means for adjusting the length of the arms from the nozzle means to the means securing the arms to the bar thereby adjusting height of the nozzle means above the ground.

14. The implement of claim 13 wherein: the means for adjusting the length of the arms includes a plurality of holes spaced along the length of the arms, and pin means extended through selected aligned holes in said arms and connected to said bar.

* * * * *